United States Patent
Zhu et al.

(10) Patent No.: US 10,629,100 B2
(45) Date of Patent: Apr. 21, 2020

(54) ARC-SHAPED DISPLAY SCREEN WITH DOUBLE-CURVED SURFACE

(71) Applicant: Nanjing Lopu Technology Co., Ltd., Nanjing (CN)

(72) Inventors: Bin Zhu, Nanjing (CN); Lili Ji, Nanjing (CN); Zhewei Weng, Nanjing (CN); Xiaobing Shen, Nanjing (CN)

(73) Assignee: Nanjing Lopu Technology Co., Ltd., Nanjing (CN)

( * ) Notice: Subject to any disclaimer, the term of this patent is extended or adjusted under 35 U.S.C. 154(b) by 0 days.

(21) Appl. No.: 16/382,212

(22) Filed: Apr. 12, 2019

(65) Prior Publication Data
US 2019/0333424 A1    Oct. 31, 2019

(30) Foreign Application Priority Data
Feb. 13, 2018  (CN) .................... 2018 2 0255325 U

(51) Int. Cl.
| | | |
|---|---|---|
| *G09F 9/30* | (2006.01) | |
| *G06F 1/16* | (2006.01) | |
| *G09G 3/32* | (2016.01) | |
| *G09F 9/33* | (2006.01) | |

(52) U.S. Cl.
CPC ............ *G09F 9/301* (2013.01); *G06F 1/1601* (2013.01); *G06F 1/1652* (2013.01); *G09F 9/33* (2013.01); *G09G 3/32* (2013.01)

(58) Field of Classification Search
None
See application file for complete search history.

(56) References Cited

U.S. PATENT DOCUMENTS

| | | | | |
|---|---|---|---|---|
| 9,483,964 | B2* | 11/2016 | Choi | ........................ G09F 9/30 |
| 10,048,539 | B2* | 8/2018 | Lee | .................. G02F 1/133305 |
| 2006/0044215 | A1* | 3/2006 | Brody | .................. G06F 3/1446 |
| | | | | 345/1.3 |
| 2009/0096804 | A1* | 4/2009 | Gerets | .................. G06F 3/1446 |
| | | | | 345/589 |
| 2009/0310065 | A1* | 12/2009 | Dunn | ................ G02F 1/133603 |
| | | | | 349/69 |
| 2009/0310337 | A1* | 12/2009 | Patterson | .............. G06F 3/1446 |
| | | | | 362/97.1 |

(Continued)

*Primary Examiner* — Elmito Breval
(74) *Attorney, Agent, or Firm* — Bayramoglu Law Offices LLC

(57) ABSTRACT

An arc-shaped display screen with double-curved surface includes an arc-shaped frame and a plurality of LED display unit boards. The plurality of LED display unit boards are mounted on an inner surface or an outer surface of the arc-shaped frame in a detachable manner, and surfaces of the plurality of LED display unit boards constitute the arc-shaped display screen with double-curved surface. The frame is formed by splicing a plurality of structural units, and adjacent structural units are fixedly connected to each other. Each of the LED display unit boards is electrically connected to an external circuit. The arc-shaped display screen with double-curved surface has a simple structure and low cost. Moreover, compared with the movie screens of the existing screens with single curved surface, the arc-shaped display screen with double-curved surface has wider viewing angle, ultra-high picture definition, and high-fidelity sound quality etc.

14 Claims, 2 Drawing Sheets

(56) References Cited

U.S. PATENT DOCUMENTS

| | | | |
|---|---|---|---|
| 2012/0019490 A1* | 1/2012 | Huang | G09G 3/32 |
| | | | 345/205 |
| 2014/0009914 A1* | 1/2014 | Cho | G09F 9/35 |
| | | | 362/97.3 |
| 2014/0197727 A1* | 7/2014 | Qin | H01L 33/00 |
| | | | 313/500 |
| 2017/0321436 A1* | 11/2017 | Dammer | E04F 15/06 |

* cited by examiner

ARC-SHAPED DISPLAY SCREEN WITH DOUBLE-CURVED SURFACE

CROSS REFERENCE TO THE RELATED APPLICATIONS

This application is based upon and claims priority to Chinese Patent Application No. 201820255325.8, filed on Feb. 13, 2018, the entire contents of which are incorporated herein by reference.

TECHNICAL FIELD

The present invention belongs to the technology field of movie screens, in particular to an arc-shaped display screen being a hyperboloid.

BACKGROUND

The industry of light-emitting diode (LED) display screen has developed in the past forty years. Since the display technology is becoming more sophisticated and the display market is expanded continuously, people have long been accustomed to the single common flat display screen. There is an urgent need for creative display products that are more attractive or can provide a better experience.

At present, screens with single curved surface available in the market include circular screens, wavy screens, etc., which are assembled by rigid or flexible display units. Although the circular screen has a larger viewing angle and a better immersion feeling than the flat screen, the inclusiveness of the screen with single curved surface is not strong enough to make people feel full immersion. In addition to the rendering of the video pictures, the creation of immersion feeling requires a coordination of the audio. The existing large-size screen with single curved surface has an audio system provided around the screen, thus causing a poor experience of video and audio.

SUMMARY

In order to solve the above defects of the prior art, the present invention provides an arc-shaped display screen being a hyperboloid.

The technical solution of the present invention is as follows.

The present invention provides an arc-shaped display screen being a hyperboloid including an arc-shaped frame and a plurality of trapezoidal or quadrilateral-like LED display unit boards. The plurality of LED display unit boards are mounted on an inner surface or outer surface of the arc-shaped frame by screws or magnets in a detachable manner, and surfaces of the plurality of LED display unit boards constitute the arc-shaped display screen being a hyperboloid.

The frame is formed by splicing a plurality of structural units, and adjacent structural units are fixedly connected.

Each of the LED display unit boards is a flat board and is electrically connected to an external circuit.

In an embodiment provided by the present invention, a plurality of LED lights are provided on the LED display unit boards at intervals. The plurality of LED lights form a pixel matrix of M rows×N columns, where M and N are integers, and the pixel matrix is in a diamond shape, a square shape, or a rectangular shape.

In an embodiment provided by the present invention, the length, width and height of the LED lights are less than or equal to 2.1 mm, 2.1 mm, and 2.0 mm, respectively.

In an embodiment provided by the present invention, a sound transmitting gap is provided between the LED display unit boards.

In an embodiment provided by the present invention, a sound transmitting hole is further provided on the LED display unit boards.

In an embodiment provided by the present invention, a fixed connection is a weld connection, a screw connection, or a riveting connection.

In an embodiment provided by the present invention, each of the LED display unit boards has a one-board structure, a two-board structure or a multi-board structure, and each of the LED display unit boards has a primary color type of three primary colors, double primary colors, or single primary color.

Advantages: the present invention has the advantages of simple structure and low cost. Moreover, compared with the movie screens of the existing screens with single curved surface, the present invention has wider viewing angle, ultra-high picture definition, and high fidelity sound quality etc. The present invention can provide a full immersive feeling for the users watching a movie, so the audience can feel a stronger sense of presence and substitution, thereby greatly improving the viewing experience of people.

BRIEF DESCRIPTION OF THE DRAWINGS

In order to clarify the technical solutions of the embodiments of the present invention, the drawings used in the embodiments will be briefly described below. It should be understood that the following drawings only show some embodiments of the present invention, and therefore should not be regarded as a limit of the scope. For those of ordinary skill in the art, other relevant drawings can further be obtained from these drawings without any creative effort.

Figure 1:
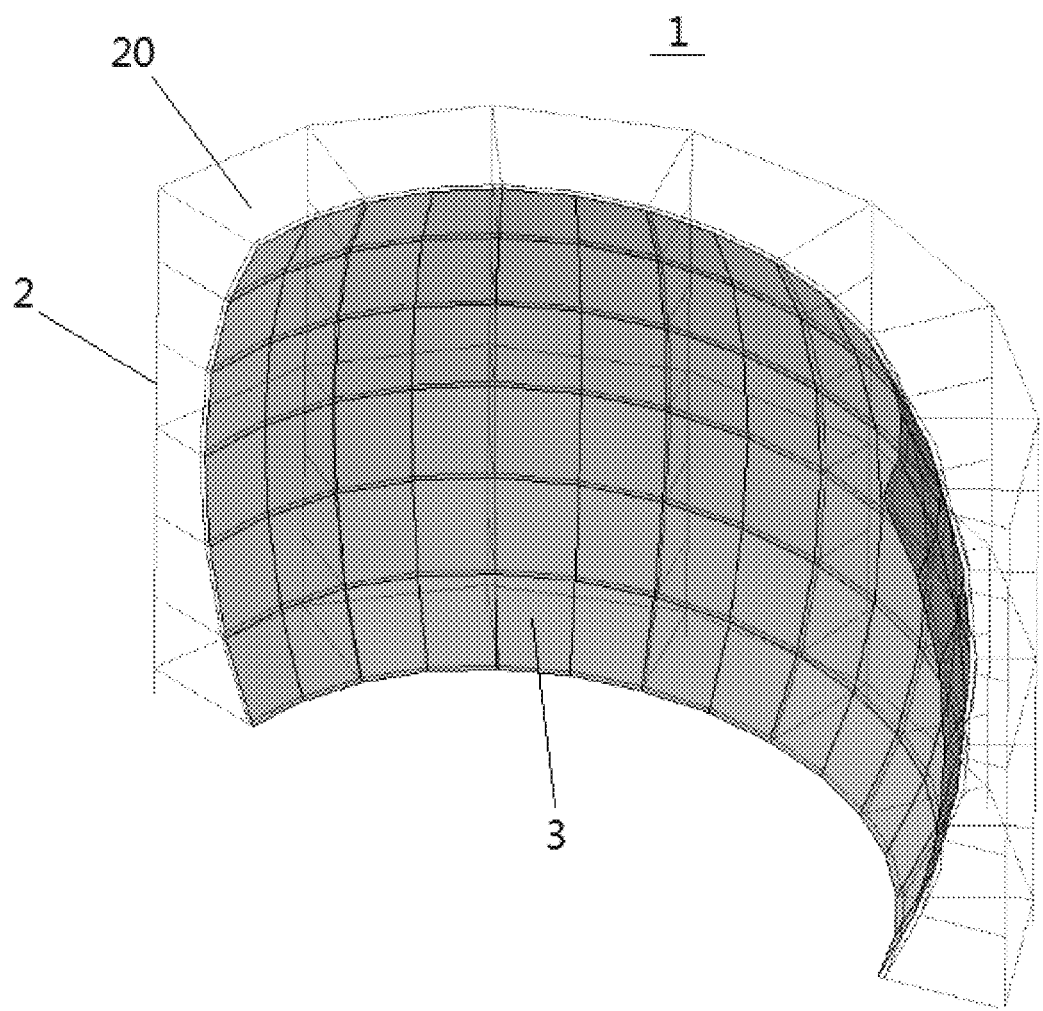
FIG. 1 is a structural diagram of an arc-shaped display screen being a hyperboloid provided by the present invention.

As shown in the figures: 1—arc-shaped display screen being a hyperboloid; 2—frame; 20—structural unit; 3—LED display unit board; 30—sound transmitting hole; 31—sound transmitting gap; and 32—LED light.

DETAILED DESCRIPTION OF THE EMBODIMENTS

The present invention is further described with reference to the drawings and embodiments.

In order to clarify the objectives, technical solutions, and advantages of the embodiments of the present invention, the technical solutions of the embodiments of the present invention are described clearly and completely with reference to the drawings in the embodiments of the present invention. Obviously, the described embodiments are a part of the embodiments of the present invention, rather than all. Therefore, the following detailed description of the embodiments of the present invention shown in the drawings is not intended to limit the scope of the present invention, but merely to describe the selected embodiments of the present invention. Based on the embodiments in the present invention, all other embodiments obtained by ordinary technicians in the art without any creative work fall within the scope of the present invention.

In the description of the present invention, it should be understood that the terms indicating the orientation or position relationship are based on the orientation or position relationship shown in the drawings, which is merely intended to facilitate the description and simplify the description of the present invention, rather than indicate or imply that the device or element referred to must have a specific orientation or be constructed and operated in a specific orientation, and therefore cannot be considered as a limit to the present invention.

In the present invention, unless otherwise explicitly stated and limited, terms such as "install", "interconnect" "connect", and "fix" should be understood broadly. For example, they may be fixedly connected, detachably connected, or integrally connected; may be mechanically connected or electrically connected; may be directly connected or indirectly connected through a medium; may be an intercommunication of two components or an interaction between two components. For those of ordinary skill in the art, the specific meaning of the above terms in the present invention can be understood according to the specific context.

In the present invention, unless otherwise explicitly stated and limited, the first feature being arranged above or below the second feature may include the condition where the first feature directly contacts the second feature, or may include the condition where the first feature indirectly contacts the second feature through additional features between them. Moreover, the first feature being arranged above, over, or on the second feature includes the condition where the first feature is located directly above or obliquely above the second feature, or merely indicates that the horizontal height of the first feature is higher than that of the second feature. The first feature being arranged down, below or under the second feature includes that the first feature is located directly below and obliquely below the second feature, or merely indicates that the horizontal height of the first feature is less than that of the second feature.

EMBODIMENTS

As shown in FIG. 1, the present embodiment provides an arc-shaped display screen being a hyperboloid 1 including an arc-shaped frame 2 and a plurality of trapezoidal or quadrilateral-like LED display unit boards 3. The plurality of LED display unit boards 3 are mounted on an inner surface or outer surface of the arc-shaped frame 2 by screws or magnets in a detachable manner, and surfaces of the plurality of LED display unit boards 3 constitute the arc-shaped display screen being a hyperboloid 1.

The frame 2 is formed by splicing a plurality of structural units 20, and adjacent structural units 20 are fixedly connected.

Specifically, the structural units 20 of the frame 2 is a cuboid-like frame structure composed of a plurality of steel beams.

Each of the LED display unit boards 3 is a non-flexible flat board, and each of the LED display unit boards 3 is electrically connected to an external circuit, so that the external power source can supply power to each of the LED display unit boards 3.

Figure 2:
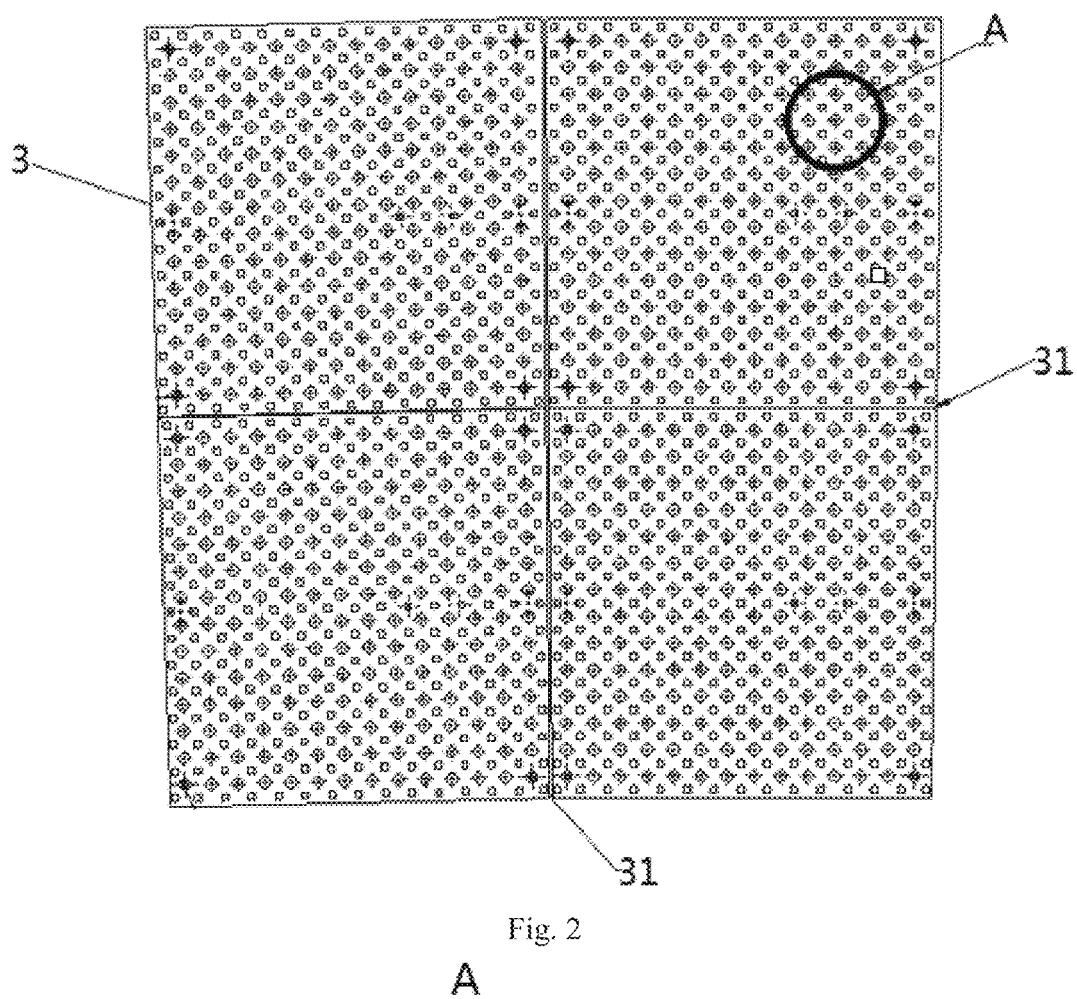
FIG. 2 is a schematic diagram showing the installation between the LED display unit boards provided by the present invention.
Figure 3:
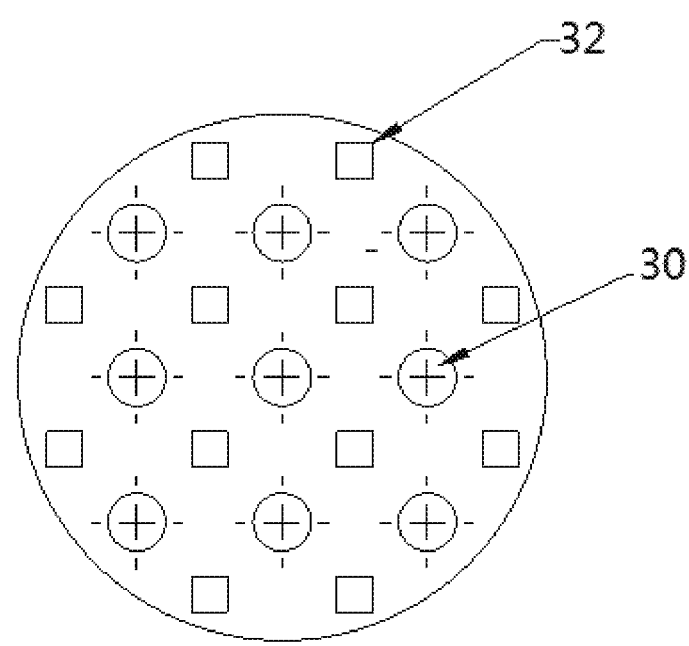
FIG. 3 is a partially enlarged view of the LED display unit boards within the circle indicated by A in FIG. 2.

As shown in FIGS. 2-3, in the embodiment, a plurality of LED lights 32 are arranged on the LED display unit boards 3 at intervals. The plurality of LED lights 32 form a pixel matrix of M rows×N columns, where M and N are integers.

Specifically, the pixel matrix is in a diamond shape, a square shape, or a rectangular shape.

In the present embodiment, the length, width and height of the LED lights 32 are less than or equal to 2.1 mm, 2.1 mm, and 2.0 mm, respectively.

In the present embodiment, a sound transmitting gap 31 is provided between the LED display unit boards 3.

Specifically, since the LED display unit boards 3 may be installed on the inner surface or the outer surface of the arc-shaped frame 2 at equal intervals or different intervals along the arc shape, the size of the sound transmitting gap 31 between each of the LED display unit boards 3 and the other neighbor LED display unit board 3 may be the same or different.

In the present embodiment, sound transmitting holes 30 are further provided on the LED display unit boards 3 at intervals.

It can be understood that in the present embodiment, the arc-shaped display screen being a hyperboloid 1 may be provided with either the sound transmitting hole 30 or the sound transmitting gap 31, or both the sound transmitting hole 30 and the sound transmitting gap 31.

Specifically, each of the LED display unit boards 3 has a one-board structure, a two-board structure, or a multi-board structure, and each of the LED display unit boards 3 has a primary color type of three primary colors, double primary colors, or single primary color.

In the present embodiment, the LED display unit board 3 may be mounted on the arc-shaped frame 2 by screw connection or magnetic attraction.

In the present embodiment, the fixed connection is a weld connection, a screw connection, or a riveting connection.

The installation procedure of the arc-shaped display screen being a hyperboloid 1 provided in this embodiment is as follows:

1) according to the size of the required arc-shaped display screen being a hyperboloid 1, the above-mentioned structural units 20 are spliced through a welding connection or riveting connection to form an arch-like arc-shaped frame 2;

2) the above-mentioned LED display unit boards 3 are mounted on the inner surface or outer surface of the arc-shaped frame 2 at equal or unequal intervals, the surfaces of the LED display unit boards 3 constitute the above-mentioned arc-shaped display screen being a hyperboloid 1;

3) the circuit board of each of the LED display unit boards 3 is electrically connected to an external power source to ensure that the LED display unit boards 3 can be normally energized and operated;

4) the size of the sound transmitting gap 31 between the LED display unit boards 3 is adjusted; and 5) the flatness of the entire arc-shaped display screen being a hyperboloid 1 is finally adjusted.

The advantages of the arc-shaped display screen being a hyperboloid provided by the present embodiment are as follows. The present invention has the advantages of simple structure and low cost. Moreover, compared with the movie screens of the existing screens with single curved surface, the present invention has wider viewing angle, ultra-high picture definition, and high fidelity sound quality etc. The present invention can provide a full immersive feeling for the users watching a movie, so the audience can feel a stronger sense of presence and substitution, thereby greatly improving the viewing experience of people.

The above description is not intended to limit the present invention in any form. Although the present invention has been disclosed above with the preferred embodiments, it is not intended to limit the present invention. Any person skilled in the art can make some improvements or modifications to achieve equivalent embodiments with equivalent substitutions based on the above-disclosed technical contents without departing from the scope of technical solution of the present invention. However, any simple modifications, equivalent changes and modifications to the above embodiments based on the technical essence of the present invention without departing from the contents of the technical solution of the present invention still fall within the scope of the present invention.

What is claimed is:

1. An arc-shaped display screen being a hyperboloid comprising: an arc-shaped frame and a plurality of LED display unit boards, wherein, each of the plurality of LED display unit boards has a quadrilateral shape, the plurality of LED display unit boards are detachably mounted on an inner surface or an outer surface of the arc-shaped frame by screws or magnets, and surfaces of the plurality of LED display unit boards constitute the arc-shaped display screen being the hyperboloid;

the arc-shaped frame is comprised of a plurality of structural units, and adjacent structural units are fixedly connected;

each of the LED display unit boards is a non-flexible flat board and is electrically connected to an external circuit.

2. The arc-shaped display screen of claim 1, wherein, a plurality of LED lights are arranged on the plurality of LED display unit boards at intervals; and the plurality of LED lights form a pixel matrix of M rows×N columns, wherein M and N are integers, and the pixel matrix is in a diamond shape, a square shape, or a rectangular shape.

3. The arc-shaped display screen of claim 2, wherein, a length, a width, and a height of each of the plurality of LED lights are less than or equal to 2.1 mm, 2.1 mm, and 2.0 mm, respectively.

4. The arc-shaped display screen of claim 2, wherein, a sound transmitting gap is provided between the plurality of LED display unit boards.

5. The arc-shaped display screen of claim 4, wherein a size of the sound transmitting gap between each of the plurality of LED display unit boards is different.

6. The arc-shaped display screen of claim 4, wherein the sound transmitting gap between each of the plurality of LED display unit boards has a same size.

7. The arc-shaped display screen of claim 2, wherein, sound transmitting holes are further provided on the plurality of LED display unit boards at intervals.

8. The arc-shaped display screen of claim 1, wherein, the fixed connection is a weld connection, a screw connection, or a riveting connection.

9. The arc-shaped display screen of claim 1, wherein, the plurality of LED display unit boards have a one-board structure, a two-board structure, or a multi-board structure, and has a primary color type of three primary colors, double primary colors, or single primary color.

10. The arc-shaped display screen of claim 1, wherein, the LED display unit boards are installed on the inner surface or the outer surface of the arc-shaped frame at different intervals along the arc-shaped display screen.

11. The arc-shaped display screen of claim 1, wherein, each of the plurality of structural units is a cuboid frame structure composed of a plurality of steel beams.

12. The arc-shaped display screen of claim 1, wherein, sound transmitting holes are further provided on the plurality of LED display unit boards at intervals.

13. The arc-shaped display screen of claim 1, wherein, the plurality of LED display unit boards are detachably mounted on the inner surface or the outer surface of the arc-shaped frame by the magnets.

14. The arc-shaped display screen of claim 1, wherein, the plurality of LED display unit boards are detachably mounted on the inner surface or the outer surface of the arc-shaped frame by the screws.

* * * * *

(12) EX PARTE REEXAMINATION CERTIFICATE (12174th)
United States Patent
Zhu et al.

(10) Number: US 10,629,100 C1
(45) Certificate Issued: Nov. 17, 2022

(54) ARC-SHAPED DISPLAY SCREEN BEING A HYPERBOLOID

(71) Applicant: Nanjing Lopu Technology Co., Ltd., Nanjing (CN)

(72) Inventors: Bin Zhu, Nanjing (CN); Lili Ji, Nanjing (CN); Zhewei Weng, Nanjing (CN); Xiaobing Shen, Nanjing (CN)

(73) Assignee: NANJING LOPU TECHNOLOGY CO., LTD, Nanjing (CN)

Reexamination Request:
No. 90/014,687, Mar. 1, 2021

Reexamination Certificate for:
Patent No.: 10,629,100
Issued: Apr. 21, 2020
Appl. No.: 16/382,212
Filed: Apr. 12, 2019

(30) Foreign Application Priority Data

Feb. 13, 2018 (CN) .................. 2018 2 0255325 U

(51) Int. Cl.
*G09F 9/302* (2006.01)
*G06F 1/16* (2006.01)
*G09G 3/32* (2016.01)
*G09F 9/33* (2006.01)
*G09F 9/30* (2006.01)

(52) U.S. Cl.
CPC .............. *G09F 9/3026* (2013.01); *G09F 9/33* (2013.01); *G06F 1/1601* (2013.01); *G06F 1/1652* (2013.01); *G09F 9/301* (2013.01); *G09G 3/32* (2013.01)

(58) Field of Classification Search
CPC .......... G09F 9/301; G09F 9/33; G09F 9/3026; G06F 1/1601; G06F 1/1652; G09G 3/32
See application file for complete search history.

(56) References Cited

To view the complete listing of prior art documents cited during the proceeding for Reexamination Control Number 90/014,687, please refer to the USPTO's Patent Electronic System.

*Primary Examiner* — Henry N Tran

(57) ABSTRACT

An arc-shaped display screen with double-curved surface includes an arc-shaped frame and a plurality of LED display unit boards. The plurality of LED display unit boards are mounted on an inner surface or an outer surface of the arc-shaped frame in a detachable manner, and surfaces of the plurality of LED display unit boards constitute the arc-shaped display screen with double-curved surface. The frame is formed by splicing a plurality of structural units, and adjacent structural units are fixedly connected to each other. Each of the LED display unit boards is electrically connected to an external circuit. The arc-shaped display screen with double-curved surface has a simple structure and low cost. Moreover, compared with the movie screens of the existing screens with single curved surface, the arc-shaped display screen with double-curved surface has wider viewing angle, ultra-high picture definition, and high-fidelity sound quality etc.

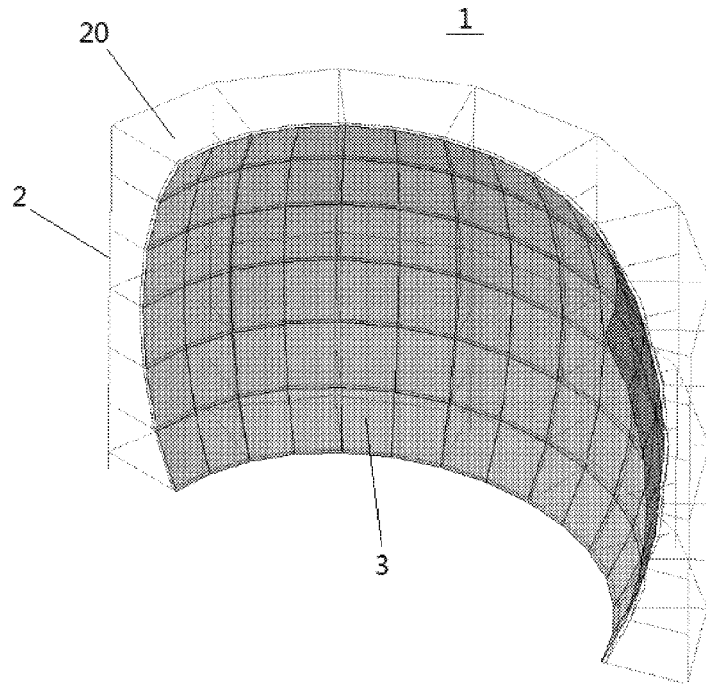

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-11 is confirmed.

Claims 12-14 are cancelled.

New claims 15-23 are added and determined to be patentable.

*15. An arc-shaped display screen being a hyperboloid comprising: an arc-shaped frame and a plurality of LED display unit boards, wherein, each of the plurality of LED display unit boards has a quadrilateral shape, the plurality of LED display unit boards are detachably mounted on an inner surface or an outer surface of the arc-shaped frame by screws or magnets, and surfaces of the plurality of LED display unit boards constitute the arc-shaped display screen being the hyperboloid;*

*the arc-shaped frame is comprised of a plurality of structural units, and adjacent structural units are fixedly connected;*

*each of the LED display unit boards is a non-flexible flat board and is electrically connected to an external circuit; and*

*a sound transmitting gap is provided between the plurality of LED display unit boards; and*

*sound transmitting holes are further provided on the plurality of LED display unit boards at intervals.*

*16. The arc-shaped display screen of claim 15, wherein, a plurality of LED lights are arranged on the plurality of LED display unit boards at intervals; and the plurality of LED lights form a pixel matrix of M rows × N columns, wherein*

*M and N are integers, and the pixel matrix is in a diamond shape, a square shape, or a rectangular shape.*

*17. The arc-shaped display screen of claim 16, wherein, a length, a width, and a height of each of the plurality of LED lights are less than or equal to 2.1 mm, 2.1 mm, and 2.0 mm, respectively.*

*18. The arc-shaped display screen of claim 15, wherein a size of the sound transmitting gap between each of the plurality of LED display unit boards is different.*

*19. The arc-shaped display screen of claim 15, wherein the sound transmitting gap between each of the plurality of LED display unit boards has a same size.*

*20. The arc-shaped display screen of claim 15, wherein, the fixed connection is a weld connection, a screw connection, or a riveting connection.*

*21. The arc-shaped display screen of claim 15, wherein, the plurality of LED display unit boards have a one-board structure, a two-board structure, or a multi-board structure, and have a primary color type of three primary colors, double primary colors, or single primary color.*

*22. The arc-shaped display screen of claim 15, wherein, the LED display unit boards are installed on the inner surface or the outer surface of the arc-shaped frame at different intervals along the arc-shaped display screen.*

*23. The arc-shaped display screen of claim 15, wherein, each of the plurality of structural units is a cuboid frame structure composed of a plurality of steel beams.*

\* \* \* \* \*